United States Patent [19]

Takimoto et al.

[11] Patent Number: 5,049,188

[45] Date of Patent: Sep. 17, 1991

[54] RECORDING LIQUID

[75] Inventors: Hiroshi Takimoto, Yokohama; Tomio Yoneyama; Hideo Sano, both of Kawasaki, all of Japan

[73] Assignee: Mitsubishi Kasei Corporation, Tokyo, Japan

[21] Appl. No.: 191,254

[22] Filed: May 6, 1988

[30] Foreign Application Priority Data

May 12, 1987 [JP] Japan .................. 62-115482
Jun. 13, 1987 [JP] Japan .................. 62-147304

[51] Int. Cl.$^5$ ............................. C09D 11/02
[52] U.S. Cl. ........................... 106/20; 106/22; 252/174.21
[58] Field of Search ............ 106/20, 21, 22; 252/174.21

[56] References Cited

U.S. PATENT DOCUMENTS

| | | | |
|---|---|---|---|
| 3,846,141 | 11/1974 | Ostergren et al. | 106/22 |
| 4,409,040 | 10/1983 | Tabayashi et al. | 106/20 |
| 4,508,570 | 4/1985 | Fujii et al. | 106/20 |

FOREIGN PATENT DOCUMENTS 108477 8/1980 Japan .

*Primary Examiner*—Amelia Burgess Yarbrough
*Attorney, Agent, or Firm*—Oblon, Spivak, McClelland, Maier & Neustadt

[57] ABSTRACT

A recording liquid comprising from 0.2 to 12% by weight, based on the total weight of the recording liquid, of a water-soluble dyestuff, from 0.5 to 25% by weight, based on the total weight of the recording liquid, of at least one member selected from the group consisting of compounds of the following formulas I, II and III, and an aqueous medium:

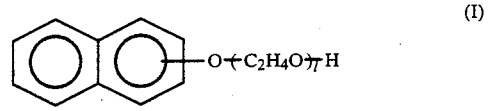

(I)

wherein l is a number of from 4 to 20,

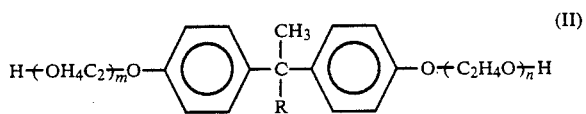
(II)

wherein R is a lower alkyl group or a phenyl group, and each of m and n is a number of from 4 to 20, and

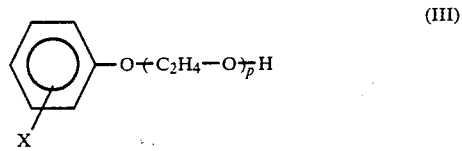
(III)

wherein X is a halogen atom, and p is a number of from 4 to 20.

18 Claims, No Drawings

RECORDING LIQUID

The present invention relates to a recording liquid for ink jet recording or for writing utensils.

When usual paper such as electrophotographic paper, bond paper or stock form paper is used as recording paper for an ink jet recording system, there have been problems with respect to the requirements such as shortening of time (quick drying properties) from the recording until the printed recording liquid no longer smudges the recorded image even when rubbed with e.g. a finger and the sharpness of the profile of the printing (printing quality) where no blotting of printing is observed.

Inks containing a certain specific water-soluble organic solvent or surfactant (Japanese Unexamined Patent publications No. 12104/1972, No. 97620/1974, No. 16042/1980, No. 29546/1980, No. 65269/1980, No. 137370/1982 and No. 68379/1984) and inks containing a base (Japanese Unexamined Patent Publications No. 12105/1972, No. 11606/1978, No. 135707/1978, No. 57862/1981, No. 133376/1981, No. 2364/1983 and No. 125767/1983) have been known. However, these inks do not provide adequate effects to solve the above-mentioned problems, or even if adequate effects are obtainable, they may have a serious drawback that they lead to clogging at the head of a nozzle.

Japanese Unexamined Patent Publication No. 137370/1982 discloses an ink containing a water-soluble dyestuff, a wetting agent and a compound of the formula:

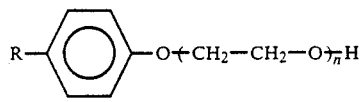

wherein R is $-C_mH_{2m+1}$ or $-O-C_{m'}H_{2m'+1}$ wherein each of m and m' is a number of from 0 to 6, and n is a number of from 1 to 10.

Further, Japanese Unexamined Patent Publication No. 68379/1984 discloses an ink containing a compound of the formula:

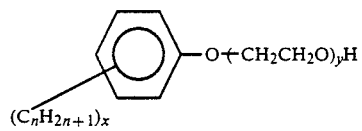

wherein n is a number of from 3 to 9, x is 2 or 3, and y is a number of from 12 to 25.

However, even these inks do not provide adequate performance particularly with respect to the printing quality of the record.

It is an object of the present invention to provide an aqueous ink composition useful particularly for ink jet recording or for writing utensils, which is excellent in the quick drying properties of printing when recorded on a usual paper and which provides an excellent record of a good printing quality with a sharp profile without blotting.

The present invention provides a recording liquid comprising from 0.2 to 12% by weight, based on the total weight of the recording liquid, of a water-soluble dyestuff, from 0.5 to 25% by weight, based on the total weight of the recording liquid, of at least one member selected from the group consisting of compounds of the following formulas I, II and III, and an aqueous medium:

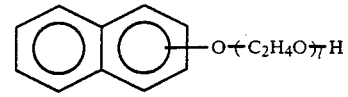

wherein l is a number of from 4 to 20,

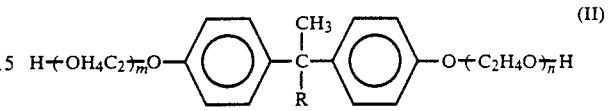

wherein R is a lower alkyl group or a phenyl group, and each of m and n is a number of from 4 to 20, and

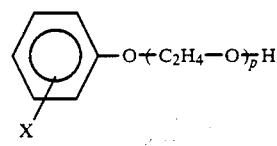

wherein X is a halogen atom, and p is a number of from 4 to 20.

Now, the present invention will be described in detail with reference to the preferred embodiments.

In the compounds of the formula I which may be used in the present invention, l is a number of from 4 to 20. If l is 3 or less, the solubility in water tends to be small, and if it is 21 or more, the penetrating power into paper tends to be too small. Therefore, they are required to be within the above-mentioned range. The following compounds may be mentioned as specific examples of such compounds of the formula I:

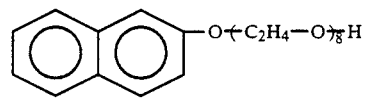

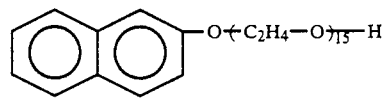

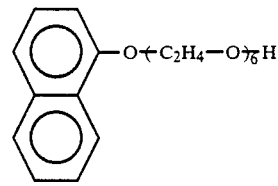

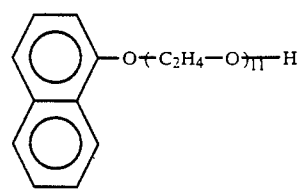

Compounds of the formula I where 1 is within a range of from 8 to 15, are preferred.

In the above formula II, each of m and n is a number of from 4 to 20. If they are 3 or less, the solubility in water tends to be small, and if they are 21 or more, the penetrating power into paper tends to be small. Therefore, they are required to be within the above-mentioned range.

R may be a lower alkyl group such as a methyl group or an ethyl group, and a phenyl group.

The following compounds may be mentioned as specific examples of the compounds of the formula II.

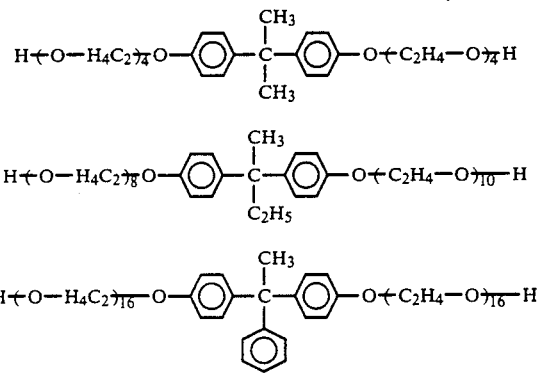

Compounds of the formula II wherein each of m and n is within a range of from 8 to 12 are preferred.

In the above formula III, p is a number of from 4 to 20. If p is 3 or less, the solubility in water tends to be small, and if it is 21 or more, the penetrating power into paper tends to be small, such being undesirable. Therefore, it is required to be within the above-mentioned range.

The halogen atom for X may be a fluorine atom, a chlorine atom, a bromine atom and an iodine atom.

The following compounds may be mentioned as specific examples of the halogen-substituted phenyl ether compounds of polyethylene glycol of the formula III.

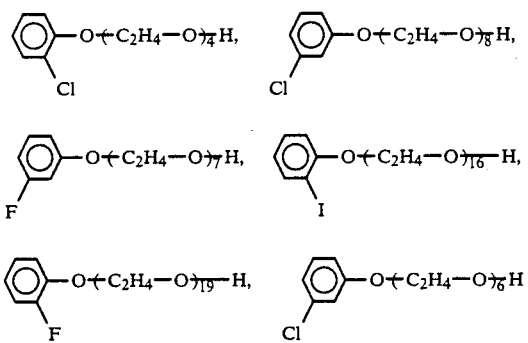

Among them, compounds of the formula III wherein p is a number within a range of from 4 to 8 are preferably employed.

Further, from the viewpoint of the discharge stability and the storage stability, those having the halogen atom of X at the ortho- or meta- position relative to the ether linkage are preferred to those having the halogen atom at the para-position.

These compounds may be prepared in accordance with the method as disclosed in e.g. Mh. Chem. 77 (1947) 80 by reacting ethylene oxide to naphthol in the case of the compound of the formula I, to a bisphenol A having the corresponding substituent in the case of the compound of the formula II and to a corresponding halogenated phenol in the case of the compound of the formula III.

In the present invention, if the content of these compounds in the recording liquid is less than 0.5% by weight based on the total weight of the recording liquid, the amount is inadequate to obtain adequate quick drying properties. On the other hand, if the content exceeds 25% by weight, the viscosity of the recording liquid tends to increase. Therefore, the content is usually within a range of from 0.5 to 25% by weight, preferably from 5 to 20% by weight.

These compounds may be used alone or in combination as a mixture of a plurality of compounds represented by the same formula differing in the susbstituents or in the number of $(C_2H_4-O-)$ groups, or a plurality of compounds represented by the different formulas. Further, when a mixture of compounds differing e.g. in the number of $(C_2H_4-O-$ groups is obtained by the production, such a mixture may be used as it is.

These compounds are effective particularly for the improvement of the printing quality and quick drying properties of the printing. Such effects are particularly remarkable when the compounds of the formula I and/or II are used in the combination with the compounds of the formula III.

The water-soluble dyestuff which may be used in the present invention includes, for example, azo type, anthraquinone type, quinophthalone type, indigo type and phthalocyanine type direct and acid dyes, such as C.I. Direct Black-17, -19, -22, -32, -51, -80, -91, -151 and -154, C.I. Direct Blue-86 and -199, C.I. Direct Red-80, C.I. Direct Yellow-86 and -142, C.I. Acid Black-2, -24, -26, -48, -52, -63, -172, -194 and -208, C.I. Acid Blue-9, -185 and -254, C.I. Acid Red-8, -35, -37 and -257, C.I. Acid Yellow-23 and -49 and C.I. Food Black-2. However, the water-soluble dyestuff is not restricted to such specific examples.

The content of the water-soluble dyestuff in the recording liquid is usually within a range of from 0.2 to 12% by weight, preferably from 2 to 8% by weight, based on the total weight of the recording liquid.

The aqueous medium of the present invention preferably contains, in addition to water, a water-soluble organic solvent such as ethylene glycol, propylene glycol, butylene glycol, diethylene glycol, triethylene glycol, polyethylene glycol (#200), polyethylene glycol (#400), glycerol, N-methyl-pyrrolidone, N-ethyl-pyrrolidone, 1,3-dimethyl-imidazolidinone, ethylene glycol monoallyl ether, ethylene glycol monomethyl ether or diethylene glycol monomethyl ether. The content of the aqueous medium is determined depending upon the contents of the water-soluble dyestuff, the compounds of the formulas I, II and III and other components. It is usually within a range of from 20 to 89.5% by weight based on the total weight of the recording liquid. In such a case, a total amount of the compounds of the formulas I, II and III and the water-soluble organic solvent is preferably selected not to exceed 40% by weight based on the total weight of the recording liquid.

The recording liquid of the present invention may contain pectin as the case requires. The pectin to be used in the present invention is the one obtained by hydrolyzing protopectin contained in fruits or vegetables and is commercially available as an additive to foods such as jelly, jam, ice cream and mayonnaise. It may be added in an amount within a range of from 0.01 to 2% by weight, preferably from 0.05 to 1% by weight, based on the total weight of the recording liquid.

Various additives may be added to the recording liquid of the present invention. Alkanol amines to be added as such additives, may be mono-, di- and tri-ethanol amines or mono-, di- and tri-propanol amines. The content of such amines is usually within a range of from 1 to 10% by weight based on the total weight of the recording liquid.

The pH of the recording liquid of the present invention is adjusted usually at a level of from 6 to 10.

Further, with the recording liquid of the present invention, it is possible to further improve the quick drying properties after printing and the printing quality by adding from 0.1 to 10% by weight, preferably from 0.5 to 5% by weight, based on the total weight of the recording liquid, of a compound selected from the group consisting of urea, thiourea, biuret and semicarbazide.

The recording liquid of the present invention is suitable for ink jet recording or for writing utensils.

Such a recording liquid is required not to clog the ink jet nozzle when used for an ink jet printer and have good recording properties (such as signal response property, stability in the formation of ink drops, discharge stability and continuous recording for a long period of time), quick drying properties, light resistance, weather resistance, water resistance and printing quality, and it is also required to have storage stability as ink. The recording liquid of the present invention is excellent particularly in the quick drying properties and printing quality among such properties. Here, excellent printing quality means that when jetting of dots is conducted continuously, the shape of dots is substantially circular, their size is properly small and the profile of dots is sharp without a feather ring (blotting) around the periphery of dots.

Now, the present invention will be described in further detail with reference to Examples. However, it should be understood that the present invention is by no means restricted by such specific Examples.

EXAMPLE 1

| Composition of recording liquid | Amount (% by weight) |
| --- | --- |
| C.I. Direct Black-154 | 3 |
| Ethylene glycol | 22 |
|  (where l: mixture of 4–7) | 20 |
| Water | Rest |
| Total | 100 |

The above-identified components were thoroughly mixed and dissolved in a container, then press-filtered through a teflon filter with a pore diameter of 1 μm and deaerated by means of a vacuum pump to obtain a recording liquid.

By using the recording liquid thus obtained, ink jet printing was conducted by means of an ink jet printer (IP-130K, manufactured by Epson K.K.), whereby the quick drying properties and the printing quality were evaluated in accordance with the following methods (a) and (b). (a) Quick drying properties: Printing was made on electrophotographic paper (manufactured by Fuji Xerox K.K.), bond paper and stock form paper (manufactured by Lion Jimuki K.K.), and 30 seconds later, printed portions were rubbed with a finger and the presence or absence of smudge of the printed images was evaluated.

In each case, no smudge was observed, indicating excellent quick drying properties.

(b) Printing quality: Each of dots printed on the above recording papers was observed by a microscope to visually evaluate the dot sizes (whether they are sufficiently small), the presence or absence of feathering (blotting) around the periphery of dots and the shapeness of the dot profiles.

In each case, no feather ring was observed, and the dot profiles were sharp.

Further, the ink jet recording properties were evaluated in accordance with the following methods (c) to (f).

(c) Storage stability of the recording liquid: The recording liquid was sealed in glass containers, which were stored at temperatures of 0° C. and 60° C. for 6 months, whereupon no precipitation of insolubles was observed, and there was no change in the physical properties or the color tone of the recording liquid.

(d) Discharge stability: Continuous jetting for 24 hours was conducted in atmospheres of room temperature, 5° C. and 40° C., respectively. Under each condition, printing of high quality was carried out under a stabilized condition throughout the continuous operation.

(e) Discharge response: Intermittent discharge for every two seconds and discharge after an interval of two months were examined. In each case, no clogging was observed at the head of the nozzle, and the printing was uniformly conducted under a stabilized condition.

(f) Quality of the printed image: The printed image had a high density and was sharp. Upon exposure to room light for 3 months, the decrease in the density was less than 1%, and when immersed in water for 1 minute, blotting of the printed image was extremely little.

COMPARATIVE EXAMPLE 1

In the same manner as in Example 1, a recording liquid was prepared by using

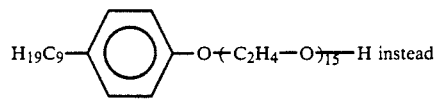 instead of 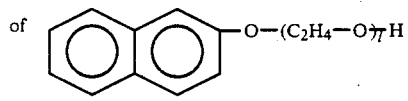

(where l: mixture of 4–7) in of (H Example 1, and the quick drying properties and the printing quality were examined in accordance with the methods (a) and (b) in Example 1. Although no smudge of the printed image appeared after 30 seconds, blotting of dots in the transverse direction was substantial, and the dot profiles blurred. Further, foaming was substantial.

EXAMPLE 2

| Composition of recording liquid | Amount (% by weight) |
|---|---|
| C.I. Direct Black-19 | 3 |
| Glycerol | 10 |
| Ethylene glycol | 10 |
| 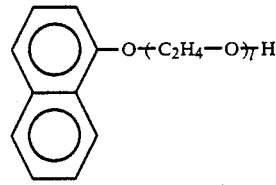 (where l: mixture of 8-10) | 10 |
| Water | Rest |
| Total | 100 |

In the same manner as in Example 1, a recording liquid having the above composition was prepared, and various properties were examined in accordance with the methods (a) to (f) in Example 1, whereby good results were obtained in all properties.

COMPARATIVE EXAMPLE 2

In the same manner as in Example 2, a recording liquid was prepared without using

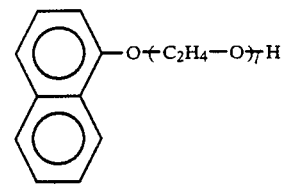

(where l: mixture of 8-10) in Example 2, and various properties were examined in accordance with the methods (a) to (e) in Example 1. It took 10 minutes until smudge of the printed image no longer appeared, and feather ring around the periphery of the dots was substantial.

EXAMPLES 3 to 12

In the same manner as in Example 1, recording liquids having the compositions as identified in Table 1 were prepared and evaluated in accordance with the methods (a) to (f) in Example 1, whereby they were all found to have excellent properties.

TABLE 1

| Example No. | Composition of recording liquid Components | Amount (% by weight) |
|---|---|---|
| 3 | C.I. Direct Black-154 | 1.5 |
|  | C.I. Direct Black-19 | 1.5 |
|  | Ethylene glycol monomethyl ether | 10 |
|  | Ethylene glycol | 10 |
|  | 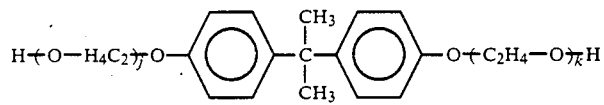 (where j: mixture of 6-10; k: mixture of 6-10) | 10 |
|  | Triethanolamine | 5 |
|  | Water | Rest |
|  | Total | 100 |
| 4 | C.I. Direct Black-199 | 2 |
|  | Diethylene glycol | 15 |
|  | N-methylpyrrolidone | 15 |
|  | 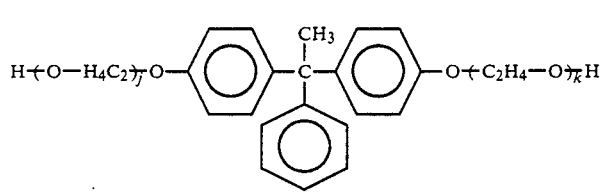 (where j: mixture of 10-13; k: mixture of 10-13) | 8 |
|  | Urea | 1 |
|  | Water | Rest |
|  | Total | 100 |
| 5 | C.I. Direct Red-80 | 2 |
|  | Diethylene glycol monobutyl ether | 5 |
|  | Ethylene glycol | 15 |
|  | 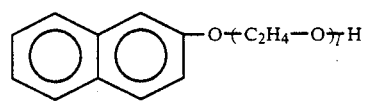 (where l: mixture of 12-16) | 14 |
|  | Water | Rest |

TABLE 1-continued

| Example No. | Composition of recording liquid Components | Amount (% by weight) |
|---|---|---|
| | Total | 100 |
| 6 | C.I. Direct Black-17 | 4 |
| | Diethylene glycol monoethyl ether | 10 |
| | Propylene glycol | 10 |
| | 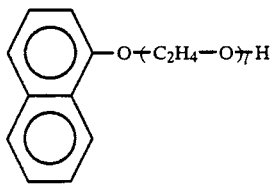 (where l: mixture of 13-18) | 10 |
| | Thiourea | 1.5 |
| | Water | Rest |
| | Total | 100 |
| 7 | C.I. Direct Black-22 | 5 |
| | Ethylene glycol monoallyl ether | 8 |
| | Diethylene glycol | 7 |
| | 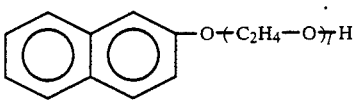 (where l: mixture of 6-9) | 7 |
| | 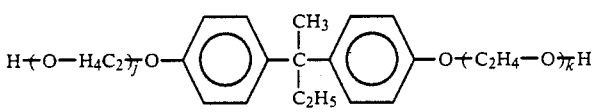 (where j: mixture of 6-8; k: mixture of 6-8) | 7 |
| | Water | Rest |
| | Total | 100 |
| 8 | C.I. Acid Black-2 | 2 |
| | C.I. Acid Black-172 | 2 |
| | Ethylene glycol | 10 |
| | Glycerol | 10 |
| | 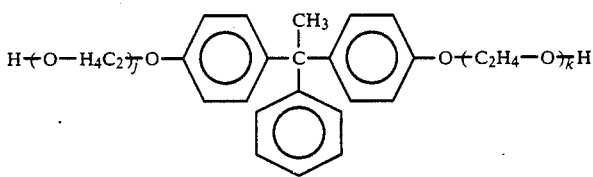 (where j: mixture of 10-15; k: mixture of 10-15) | 0.9 |
| | Dipropanolamine | 5 |
| | Urea | 3 |
| | Water | Rest |
| | Total | 100 |
| 9 | C.I. Acid Blue-185 | 3 |
| | Propylene glycol | 12 |
| | N-ethyl-pyrrolidone | 10 |
| | 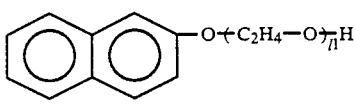 (where $l^1$: mixture of 5-9) | 5 |

TABLE 1-continued

| Example No. | Composition of recording liquid Components | Amount (% by weight) |
|---|---|---|
| | naphthalene-O-(C₂H₄-O)_{l2}-H structure (where l2: mixture of 6-11) | 10 |
| | Water | Rest |
| | Total | 100 |
| 10 | C.I. Direct Black-32 | 2.5 |
| | C.I. Direct Black-24 | 2.5 |
| | Diethylene glycol monoallyl ether | 10 |
| | Propylene glycol | 10 |
| | N-methyl-pyrrolidone | 10 |
| | H-(O-H₄C₂)_j-O-C₆H₄-C(CH₃)(C₄H₉)-C₆H₄-O-(C₂H₄-O)_k-H (where j: mixture of 10-15; k: mixture of 10-15) | 10 |
| | naphthalene-O-(C₂H₄-O)_l-H (where l: mixture of 7-11) | 10 |
| | Water | Rest |
| | Total | 100 |
| 11 | C.I. Food Black-2 | 3 |
| | naphthalene-O-(C₂H₄-O)_l-H (where l: mixture of 9-11) | 15 |
| | Glycerol | 10 |
| | Triethanolamine | 1 |
| | Water | Rest |
| | Total | 100 |
| 12 | C.I. Food Black-2 | 3 |
| | H-(O-H₄C₂)_j-O-C₆H₄-C(CH₃)(CH₃)-C₆H₄-O-(C₂H₄-O)_k-H (where j: mixture of 9-11; k: mixture of 9-11) | 15 |
| | Diethylene glycol butyl ether | 5 |
| | Water | Rest |
| | Total | 100 |

EXAMPLE 13

Recording liquids were prepared in the same manner as in Example 1 except that as the water-soluble dyestuff, C.I. Direct Black-51 or -91, C.I. Direct Blue-86, C.I. Direct Yellow-142 or -86, C.I. Acid Black-26 or -63, C.I. Acid Blue-9, or C.I. Acid Red-8, -35 or -37 was used alone, respectively, and evaluated in accordance with the methods (a) to (f) in Example 1. Good results were obtained in each case.

EXAMPLE 14

Recording liquids were prepared in the same manner as in Example 1 except that as the water-soluble dyestuff, C.I. Direct Black-80 or -151, C.I. Food Black-2, C.I. Direct Red-80, C.I. Acid Black-48, -52, -172, -194 or -208, C.I. Acid Blue-254, C.I. Acid Red-254, C.I.

Acid Red-257, or C.I. Acid Yellow-23 or -49 was used alone, respectively, and evaluated in accordance with the methods (a) to (f) in Example 1. Good results were obtained in each case.

EXAMPLE 15

| Composition of recording liquid | Amount (% by weight) |
|---|---|
| C.I. Direct Black-154 | 3 |
| Ethylene glycol | 22 |
| 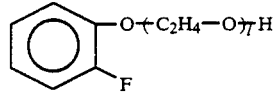 | 20 |
| (where l: mixture of 4-8) | |
| Water | Rest |
| Total | 100 |

In the same manner as in Example 1, a recording liquid having the above composition was prepared and evaluated in accordance with the methods (a) to (f) in Example 1. Good results were obtained in each evaluation.

EXAMPLE 16

| Composition of recording liquid | Amount (% by weight) |
|---|---|
| C.I. Direct Black-19 | 3 |
| Glycerol | 10 |
| Ethylene glycol | 10 |
| 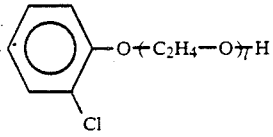 | 10 |
| (where l: mixture of 8-10) | |
| Water | Rest |
| Total | 100 |

In the same manner as in Example 1, a recording liquid having the above composition was prepared and evaluated in accordance with the methods (a) to (f) in Example 1. Good results were obtained in each evaluation.

COMPARATIVE EXAMPLE 3

In the same manner as in Example 16, a recording liquid was prepared by using

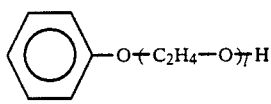

(where l: mixture of 8-10) instead of

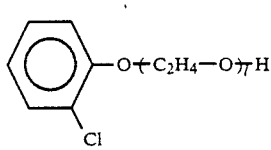

(where l: mixture of 8-10) in Example 16 and evaluated in accordance with the methods (a) to (d) in Example 1. The quick drying properties were good as in Example 16, but the printing quality was inferior, and when stored at 600° C. for 6 months for storage stability test, a substantial amount of insolubles precipitated. Further, as regards discharge stability, the discharge became impossible in 16 hours at room temperature and in 5 hours at 40° C.

EXAMPLES 17 to 23

In the same manner as in Example 1, recording liquids having the composition as identified in Table 2 were prepared and evaluated in accordance with the methods (a) to (f) in Example 1. Good results were obtained in each case.

TABLE 2

| Example No. | Composition of recording liquid | |
|---|---|---|
| | Components | Amount (% by weight) |
| 17 | C.I. Direct Black-154 | 1.5 |
| | C.I. Direct Black-19 | 1.5 |
| | Ethylene glycol monomethyl ether | 10 |
| | Ethylene glycol | 10 |
| | 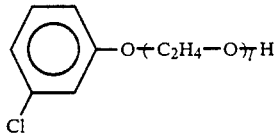 | 10 |
| | (where l: mixture of 6-9) | |
| | Triethanolamine | 5 |
| | Water | Rest |
| | Total | 100 |
| 18 | C.I. Direct Red-80 | 2 |
| | Diethylene glycol monobutyl ether | 5 |
| | Ethylene glycol | 15 |
| | 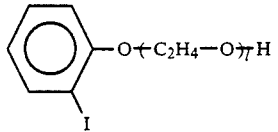 | 14 |
| | (where l: mixture of 12-16) | |
| | Water | Rest |
| | Total | 100 |
| 19 | C.I. Direct Black-17 | 4 |
| | Diethylene glycol monoethyl ether | 10 |
| | Propylene glycol | 10 |
| | 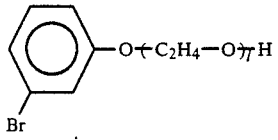 | 10 |
| | (where l: mixture of 13-18) | |
| | Thiourea | 1.5 |
| | Water | Rest |
| | Total | 100 |
| 20 | C.I. Direct Black-22 | 5 |
| | Ethylene glycol monoallyl ether | 8 |
| | Diethylene glycol | 7 |

TABLE 2-continued

| Example No. | Composition of recording liquid Components | Amount (% by weight) |
|---|---|---|
|  | [phenyl-O-(C$_2$H$_4$-O)$_l$-H with Cl substituent] (where l: mixture of 6-9) | 7 |
|  | [phenyl-O-(C$_2$H$_4$-O)$_l$-H with F substituent] (where l: mixture of 4-8) | 7 |
|  | Water | Rest |
|  | Total | 100 |
| 21 | C.I. Acid Black-2 | 2 |
|  | C.I. Acid Black-172 | 2 |
|  | Ethylene glycol | 10 |
|  | Glycerol | 10 |
|  | [phenyl-O-(C$_2$H$_4$-O)$_l$-H with Cl substituent] (where l: mixture of 9-13) | 0.9 |
|  | Dipropanolamine | 5 |
|  | Urea | 3 |
|  | Water | Rest |
|  | Total | 100 |
| 22 | C.I. Acid Blue-185 | 3 |
|  | Propylene glycol | 12 |
|  | N-ethyl-pyrrolidone | 10 |
|  | [Cl-phenyl-O-(C$_2$H$_4$-O)$_l$-H] (where l: mixture of 5-9) | 5 |
|  | [phenyl-O-(C$_2$H$_4$-O)$_l$-H with Cl substituent] (where l: mixture of 6-11) | 10 |
|  | Water | Rest |
|  | Total | 100 |
| 23 | C.I. Food Black-2 | 3 |
|  | [phenyl-O-(C$_2$H$_4$-O)$_l$-H with Cl substituent] (where l: mixture of 4-6) | 20 |
|  | Water | Rest |
|  | Total | 100 |

COMPARATIVE EXAMPLE 4

In the same manner as in Example 23, a recording liquid was prepared by using

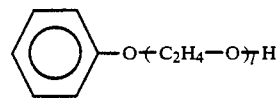

(where l: mixture of 4-6) instead of

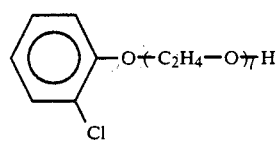

(where l: mixture of 4-6) and evaluated in accordance with the methods (a) to (d) in Example 1. It was found that the recording liquid of Example 23 was superior in the printing quality to the recording liquid of this Comparative Example.

EXAMPLE 24

Recording liquids were prepared in the same manner as in Example 1 except that as the water-soluble dyestuff, C.I. Direct Black-51 or -91, C.I. Direct Blue-86, C.I. Direct Yellow-142 or -86, C.I. Acid Black-26 or -63, C.I. Acid Blue-9, or C.I. Acid Red-8, -35 or 37 was used alone, respectively, and evaluated in accordance with the methods (a) to (f) in Example 1. Good results were obtained in each case.

EXAMPLE 25

Recording liquids were prepared in the same manner as in Example 1 except that as the water-soluble dyestuff, C.I. Direct Black-80 or -151, C.I. Food Black-2, C.I. Direct Red-80, C.I. Acid Black-48, -52, -172, -194 or -208, C.I. Acid Blue-254, C.I. Acid Red-257, or C.I. Acid Yellow-23 or -49 was used alone, respectively, and evaluated in accordance with the methods (a) to (f) in Example 1. Good results were obtained in each case.

EXAMPLE 26 to 29

In the same manner as in Example 1, recording liquids having the compositions as identified in Table 3 were prepared and evaluated in accordance with the methods (a) to (f) in Example 1. Good results were obtained in each case.

TABLE 3
| Example No. | Composition of recording liquid Components | Amount (% by weight) |
|---|---|---|
| 26 | C.I. Food Black-2 | 3 |
|  | Pectin | 0.2 |
|  | 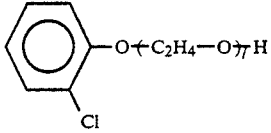 (where l: mixture of 4-6) | 20 |
|  | Water | Rest |
|  | Total | 100 |
| 27 | C.I. Acid Black-154 | 5 |
|  | 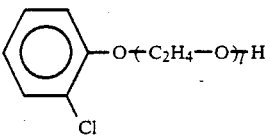 (where l: mixture of 4-6) | 13 |
|  | 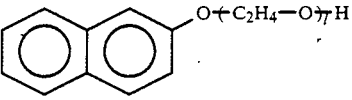 (where l: mixture of 12-14) | 10 |
|  | Water | Rest |
|  | Total | 100 |
| 28 | C.I. Direct Black-19 | 2 |
|  | 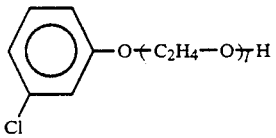 (where l: mixture of 5-7) | 15 |
|  | 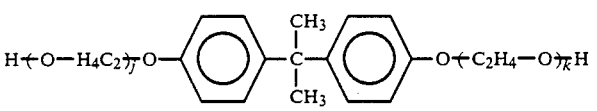 (where j: mixture of 9-11; k: mixture of 9-11) | 7 |
|  | Water | Rest |
|  | Total | 100 |
| 29 | C.I. Food Black-2 | 3 |
|  | 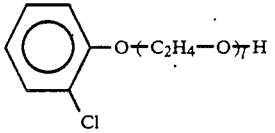 (where l: mixture of 4-7) | 10 |
|  | 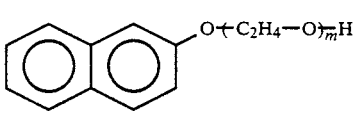 (where m: mixture of 12-16) | 5 |

TABLE 3-continued

| | Composition of recording liquid | Amount (% by weight) |
|---|---|---|
| Example No. | Components | |
| | 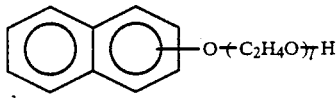<br>(where j: mixture of 8–12; k: mixture of 8–12) | 5 |
| | Water | Rest |
| | Total | 100 |

We claim:

1. A recording liquid comprising from 0.2 to 12% by weight, based on the total weight of the recording liquid, of a water-soluble dyestuff, from 0.5 to 25% by weight, based on the total weight of the recording liquid, of at least one member selected from the group consisting of compounds of the following formulas I, II and III, and an aqueous medium:

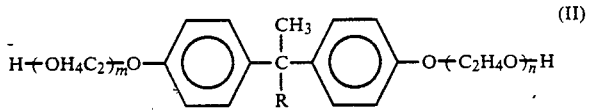

wherein l is a number of from 4 to 20,

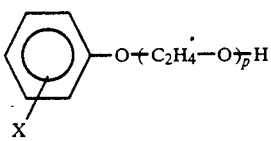

wherein R is a lower alkyl group or a phenyl group, and each of m and n is a number of from 4 to 2, and wherein X is a halogen atom, and p is a number of from 4 to 20.

2. The recording liquid according to claim 1, wherein a compound of the formula I wherein l is a number of from 8 to 15 is used.

3. The recording liquid according to claim 1, wherein a compound of the formula II wherein R is a lower alkyl group is used.

4. The recording liquid according to claim 1, wherein a compound of the formula II wherein R is a phenyl group is used.

5. The recording liquid according to claim 1, wherein a compound of the formula II wherein each of m and n is a number of from 8 to 12 is used.

6. The recording liquid according to claim 1, wherein a compound of the formula II wherein R is a lower alkyl group and each of m and n is a number of from 8 to 12 is used.

7. The recording liquid according to claim 1, wherein a compound of the formula III wherein X is attached at the ortho- or meta- position relative to the ether linkage is used.

8. The recording liquid according to claim 1, wherein a compound of the formula III wherein X is fluorine, chroline or bromine is used.

9. The recording liquid according to claim 1, wherein a compound of the formula III wherein p is a number of from 4 to 8 is used.

10. The recording liquid according to claim 1, wherein as compound of the formula III wherein X is fluorine, chlorine or bromine, and p is a number of from 4 to 8 is used.

11. The recording liquid according to claim 1, wherein a compound of the formula I and/or a compound of the formula II and a compound of the formula III are used.

12. The recording liquid according to claim 1, which contains at least one of compounds of the formula I and at least one of compounds of the formula III.

13. The recording liquid according to claim 1, which contains at least one of compounds of the formula II and at least one of compounds of the formula III.

14. The recording liquid according to claim 1, wherein the water-soluble dyestuff is within a range of from 2 to 8% by weight, based on the total weight of the recording liquid.

15. The recording liquid according to claim 1, which contains from 5 to 20% by weight, based on the total weight of the recording liquid, of the compounds of the formulas I, II and III.

16. The recording liquid according to claim 1, which further contains pectin in an amount of from 0.01 to 2% by weight, based on the total weight of the recording liquid.

17. The recording liquid according to claim 1, which further contains an alkanol amine.

18. The recording liquid according to claim 1, which further contains a compound selected from the group consisting of urea, thiourea, biuret and semicarbazide.

* * * * *